Patented Oct. 3, 1950

2,524,400

UNITED STATES PATENT OFFICE 2,524,400

CHEMICALLY MODIFIED STARCHES

Dwight L. Schoene and Victor S. Chambers, Naugatuck, Conn., assignors to United States Rubber Company, New York, N. Y., a corporation of New Jersey No Drawing. Application March 31, 1949, Serial No. 84,754

4 Claims. (Cl. 260—233.3)

This invention relates to chemically-modified starches, and their uses.

This case is a continuation-in-part of application Serial No. 37,507, filed July 7, 1948, only insofar as it relates to the above subject.

It has been found that starch, either of the cold water-insoluble or water-soluble variety (dextrins) will react with vinyl sulfone,

$(CH_2=CH)_2SO_2$, to form reaction products which are insoluble in boiling water. The concentration of vinyl sulfone may range from 0.1% to 50%, by weight, based on the starch.

Among the starches which are operative in our invention are the cereal starches such as corn starch, rice starch, wheat starch and the like; the root starches such as potato starch, cassava starch, tapioca starch, etc., as well as the starches derived from stems, fruits and seeds. Both the amylose (in cold water soluble) and amylopectin (in cold water insoluble) fractions of raw starch are reactive with vinyl sulfone to give insoluble products. The partial degradation products of starch, generally termed dextrins, are also operative. They are polymeric products obtained from starch by heating, by partial acid or base hydrolysis, or by enzymic hydrolysis.

The reaction is preferably carried out in aqueous solution, with or without a wetting agent, in the presence of a basic catalyst. As catalyst, we may employ any base or alkali which is unreactive with vinyl sulfone. Ammonia, and primary and secondary amines are reactive with vinyl sulfone. The catalyst should have a basic strength at least equivalent to that of sodium acetate. For practical purposes, however, we prefer to use stronger alkalies such as the phosphates, carbonates and hydroxides of sodium and potassium. Alkali earth metal hydroxides and quaternary ammonium hydroxides such as tetraethyl ammonium hydroxide and benzyl trimethyl ammonium hydroxide are also effective catalysts.

The reaction may also be carried out upon a fabric such as cotton or rayon which is sized with starch. In this manner the starch may be converted in situ upon the fabric, the presence of the reaction product achieving a stiffening of the fabric which is substantially retained upon subsequent washing and ironing. Care must be taken to avoid degrading the fabric with too concentrated alkali. With cotton fabrics, concentration of alkali, such as sodium hydroxide of 20–30% may be employed with a reaction time of 15 seconds or less. A concentration of 0.5% to 5% will effect essentially the same reaction in a period of 1 to 30 minutes. Concentrations ranging from 0.1% may be employed with somewhat longer reaction times.

The reaction with vinyl sulfone can be used to reduce the viscosity of starch pastes or to set starch gels. It is also useful in obtaining permanent sizes on fabrics, and in modifying starch adhesives.

The following examples are given to illustrate the invention, parts being by weight:

Example 1

Corn starch (150 parts) was stirred with a solution containing 200 parts of water, 0.75 part of vinyl sulfone (0.5% based on starch) and 1 part of a commercial wetting agent. After 10 minutes the slurry was treated with 100 parts of 3% sodium hydroxide solution and the mixture was allowed to stand at room temperature (about 80° F.). Another sample of starch was treated similarly except that 3 parts (2%) of vinyl sulfone was used. At the end of 1 hour both samples were treated with 0.5 part of acetic acid to neutralize the alkali, filtered, and washed with water.

Test portions of the wet starch, along with an untreated control, were suspended in water to give 10% concentrations and then were heated to boiling. The control starch formed a thick gel before the boiling point was reached. Neither of the treated samples gelled on boiling for 2 minutes. The sample treated with 0.5% vinyl sulfone became slightly viscous during boiling but the individual starch granules were only partially ruptured. The individual granules, only slightly swollen, were still present in the 2% sample.

This experiment demonstrates that the degree of swelling of starch granules can be varied, almost at will, by varying the concentrations of vinyl sulfone used in the treatment.

Example 2

Cotton cloth was dipped into an aqueous solution containing 5% of a water soluble dextrin obtained by the acid treatment of potato starch, 5% of vinyl sulfone, and 0.5% of the sodium salt of an alkylated aryl sulfonic acid. The cloth was put through a wringer to give 100% wet pickup. It was covered with a 10% solution of sodium hydroxide in water and the whole system was heated to 75° C. over a period of 25 minutes. The cloth was then removed from the bath, neutralized with dilute acetic acid, washed well with water, dried, and ironed. It was then appreciably stiffer than the control and had a starchy feel.

It was boiled for an hour in 0.5% soap solution and, on drying, retained much of its stiffness.

This demonstrates that the dextrin was permanently insolubilized on the fabric by the treatment.

Example 3

A starch paste was prepared by mixing 120 parts of a commercial corn starch, 1.2 g. of a glycol ether stabilizer and 680 parts of water and heating the mixture with stirring at 180° F. for 20 minutes. The paste was cooled to room temperature (ca. 80° F.), and 0.6 part (0.5% based on the starch) of vinyl sulfone followed by 50 parts of 2% sodium hydroxide were added. The mixture was stirred for 60 minutes and neutralized to pH 8 with 2% sulfuric acid. The starch paste suffered a marked decrease in viscosity due to reaction of vinyl sulfone. Similar but less marked reductions in viscosity were obtained in similar runs using 0.1% and 0.25% vinyl sulfone. In these cases the gels originally formed by the reaction were broken up by the stirring giving an overall reduction in viscosity.

Example 4

Two parts of soluble starch were dissolved in 10 parts of hot water and 1 part of vinyl sulfone was added. The solution was divided into two portions. To one portion was added 0.5 part of a 38% solution of benzyl trimethyl ammonium hydroxide in water (catalyst). The solution gelled immediately giving a stiff opaque mass.

To the other portion was added 0.5 part of a 5% solution of the same catalyst. This solution gelled after about 2 minutes on a steam bath.

Both samples dried to hard, tough products which were no longer soluble in hot water.

The starch-vinyl sulfone reaction products are cross-linked and insoluble in both cold and boiling water. Acids or bases degrade them, but at a slower rate than is required for the hydrolysis of starch to glucose. For all practical purposes, however, they are insoluble and unreactive compared to unmodified starch. They do swell, depending upon the degree of cross-linking, in water, alkalies, and cellulose solvents such as quaternary ammonium hydroxides, cupra-ammonium solution, and the like. When dry they are hard and quite brittle but soften in water with slight elastic recovery from slight deformations. They offer a means of obtaining a high solids, low viscosity starch paste useful in cosmetics, paper and textile sizing, adhesives, cleaning compounds, water color paints and many others.

Having thus described our invention, what we claim and desire to protect by Letters Patent is:

1. A cellulosic fabric sized with starch which starch has been chemically reacted with divinyl sulfone.

2. A water-insoluble product of reaction of divinyl sulfone with starch.

3. A method which comprises chemically reacting starch with divinyl sulfone whereby to form a water-insoluble product, the proportion by weight of the divinyl sulfone ranging from 0.1% to 50% based on the starch.

4. A water-insoluble product of reaction of divinyl sulfone with starch, in which reaction there is present from 0.1% to 50% by weight of divinyl sulfone based on the weight of the starch.

DWIGHT L. SCHOENE.
VICTOR S. CHAMBERS.

REFERENCES CITED

The following references are of record in the file of this patent:

UNITED STATES PATENTS

| Number | Name | Date |
| --- | --- | --- |
| 2,103,879 | Ufer | Dec. 28, 1937 |